United States Patent [19]

Wiese

[11] Patent Number: 5,783,825
[45] Date of Patent: Jul. 21, 1998

[54] METHOD AND APPARATUS FOR CORRECTING INFRARED SEARCH AND TRACK SYSTEM ERROR

[75] Inventor: Gary E. Wiese, Orlando, Fla.

[73] Assignee: Lockheed Martin Corporation, Bethesda, Md.

[21] Appl. No.: 701,400

[22] Filed: Aug. 22, 1996

[51] Int. Cl.⁶ .................................................. G01B 11/27
[52] U.S. Cl. ........................ 250/330; 250/252.1; 250/334
[58] Field of Search ................................ 250/330, 252.1, 250/334

[56] References Cited

U.S. PATENT DOCUMENTS

| | | |
|---|---|---|
| 3,816,000 | 6/1974 | Fiedler . |
| 4,498,768 | 2/1985 | Holl . |
| 4,721,386 | 1/1988 | Collyer . |
| 4,769,539 | 9/1988 | Thurston . |
| 4,772,122 | 9/1988 | Kasner . |
| 4,773,754 | 9/1988 | Eisle . |
| 4,777,366 | 10/1988 | Marx ............................... 250/330 |
| 4,792,228 | 12/1988 | Haffner . |
| 5,047,638 | 9/1991 | Cameron et al. ............... 250/330 |
| 5,052,800 | 10/1991 | Mimmack et al. . |
| 5,054,917 | 10/1991 | Pepin et al. . |
| 5,127,604 | 7/1992 | Klaus, Jr. et al. . |

*Primary Examiner*—Constantine Hannaher
*Attorney, Agent, or Firm*—Burns, Doane, Swecker & Mathis, LLP

[57] ABSTRACT

In a method for boresighting an infrared search and track sensor to an inertial reference frame provided by a boresight module, a collimated image of a reticle pattern of the boresight module is projected. The projected image is scanned with the sensor to obtain a scanned image. Rotation of the scanned image due to boresight module roll and distortion of the scanned image due to sensor roll are isolated. Distortion of the scanned image due to sensor roll is removed. An arrangement in an infrared search and track sensor is also disclosed.

6 Claims, 8 Drawing Sheets

METHOD AND APPARATUS FOR CORRECTING INFRARED SEARCH AND TRACK SYSTEM ERROR

FIELD OF THE INVENTION

The present invention relates to infrared search and track systems and, more particularly, to a method and apparatus or arrangement for determining roll error in such systems.

BACKGROUND AND SUMMARY

Various known sensor systems, e.g., Target Acquisition and Designation Systems (TADS) detect and track targets. Such sensors are typically provided with inflight boresighting arrangements in which an optical line of sight in the form of a collimated image of a point source or reticle establishes an optical reference for measuring the relative pointing errors among several sensors in elevation and azimuth.

In a scanning Infrared Search and Track (IRST) system according to the present invention, an electro-optical sensor detects targets and tracks them relative to a fixed inertial reference frame. The sensor scans a volume of space, which may be several degrees high and several tens of degrees wide, called the field of search (FOS). At any specific time, the sensor views a field of view (FOV) that corresponds to the projection of a detector array or scanner into the object space. This FOV is nominally a narrow rectangle, with its longer dimension oriented vertically and its smaller dimension oriented horizontally. The exact dimensions and orientation of the FOV are not important to the present invention. By means of a gimbal or other scanning device, the line of sight (LOS) is swept, either continuously or in a reciprocating fashion, within the FOS in a plane that is preferably perpendicular to the long dimension of the FOV. The exact orientation of the scan plane in inertial space is not important to this invention, and it may be oriented in any direction in any particular IRST system. For purposes of describing the operation of the present invention, it will be assumed that the scan plane is nominally horizontal, that is, parallel to the horizon. A scan bar consists of a single sweep of the scanning device from one side of the FOS to the other. The entire FOS may consist of several scan bars. The locations of objects within the FOS are tracked within a rectangular angular coordinate grid. Each square within this grid subtends one pixel in height and width; accordingly, the grid is called a pixel map. Angular coordinates within this grid are measured relative to a fixed inertial reference frame defined by a three-axis gyroscope.

The boresighting arrangement for this type of system provides an infrared optical reference to inertial coordinates defined by the gyroscope axes. Typically, according to the present invention, a collimator assembly, within the sensor and physically attached to the gyroscope housing, projects a collimated image of a boresight reticle into the sensor optical system. The assembly consisting of the boresight reticle, collimator, and gyroscope is referred to as the boresight module (BSM). The boresight reticle features are detected by the sensor, thereby determining the features' pixel map coordinates. If the angular coordinates of the same reticle features are known relative to the gyroscope axes, then the orientation of the pixel map coordinates may be transformed into inertial coordinates. This transformation constitutes a general transformation that permits the inertial coordinates of any object detected within the FOS to be determined. However, the inventor has recognized that roll errors between the detector or scanner and the scan axis affect the transformation so established. It is, accordingly, desirable to provide a method for separately determining BSM roll and detector or scanner error.

The present invention can be applied to any type of scanning system. For example, the reference does not have to be inertial. It could be any mechanical or electromechanical reference. However, the reference will preferably be inertial because of the precise angular tracking of multiple targets required of an IRST sensor scanning a large FOS. A similar technique was first used to align the detector of an IRST system to the azimuth axis of a fast steering mirror. This same method was subsequently used to align a detector to a fast steering mirror used as a FLIR (Forward Looking Infrared) scanner.

In accordance with one aspect of the present invention, a method for boresighting an infrared search and track sensor to an inertial reference frame provided by a boresight module is described. In accordance with the method, a collimated image of a reticle pattern of the boresight module is projected. Rotation of the scanned image due to boresight module roll, and distortion of the image due to roll of the detector array around the scan axis are isolated. Distortion of the scanned image due to detector roll may be removed by a suitable optical image rotation device positioned between the scan axis and the detector. The image rotation that remains is the roll boresight error. This value is used as a part of the transformation from the pixel map coordinates to inertial coordinates.

In accordance with another aspect of the invention, an arrangement in an infrared search and track sensor is provided. The arrangement includes a detector for scanning a field of search, and a boresight module including a boresight collimator, the boresight collimator projecting a collimated image of a reticle pattern on a reticle of the boresight collimator, and an inertial attitude unit having a roll axis, the collimated image being projected in a direction parallel to the roll axis of the inertial attitude unit. The arrangement further includes a pixel map associated with the detector, the pixel map containing an image of the scanned field of search. The detector is arranged to scan the reticle pattern so that the pixel map contains an image of the scanned reticle pattern. The arrangement further includes a processor, the processor isolating rotation of the scanned image due to roll of the boresight module around the roll axis and distortion of the scanned image due to roll of the detector.

BRIEF DESCRIPTION OF THE DRAWINGS

The features and advantages of the present invention are well understood by reading the following detailed description in conjunction with the drawings in which like numerals indicate similar elements and in which.

DETAILED DESCRIPTION

Figure 1:
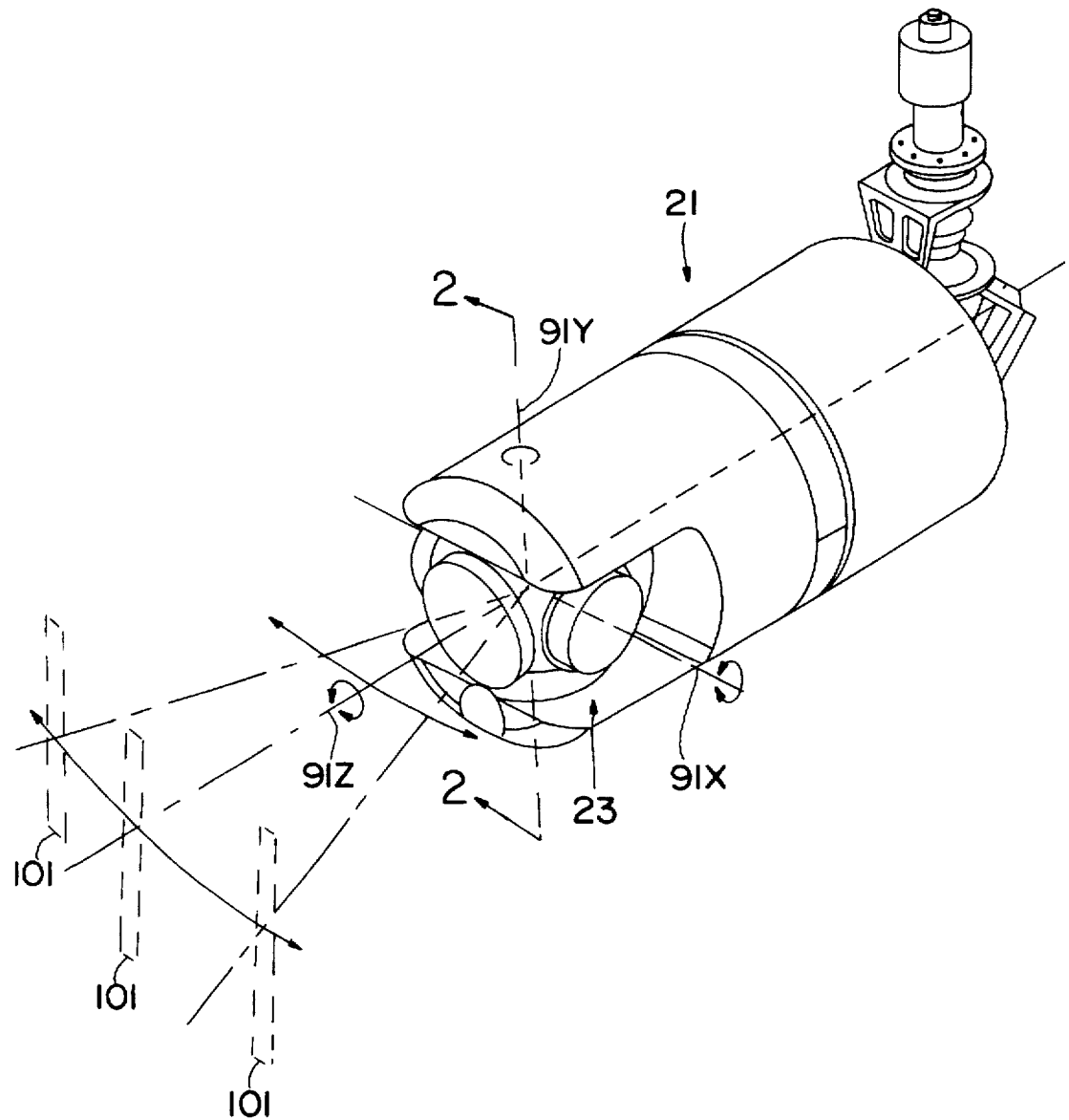
FIG. 1 is a schematic view of an arrangement for a sensor assembly according to an embodiment of the present invention.
Figure 2:
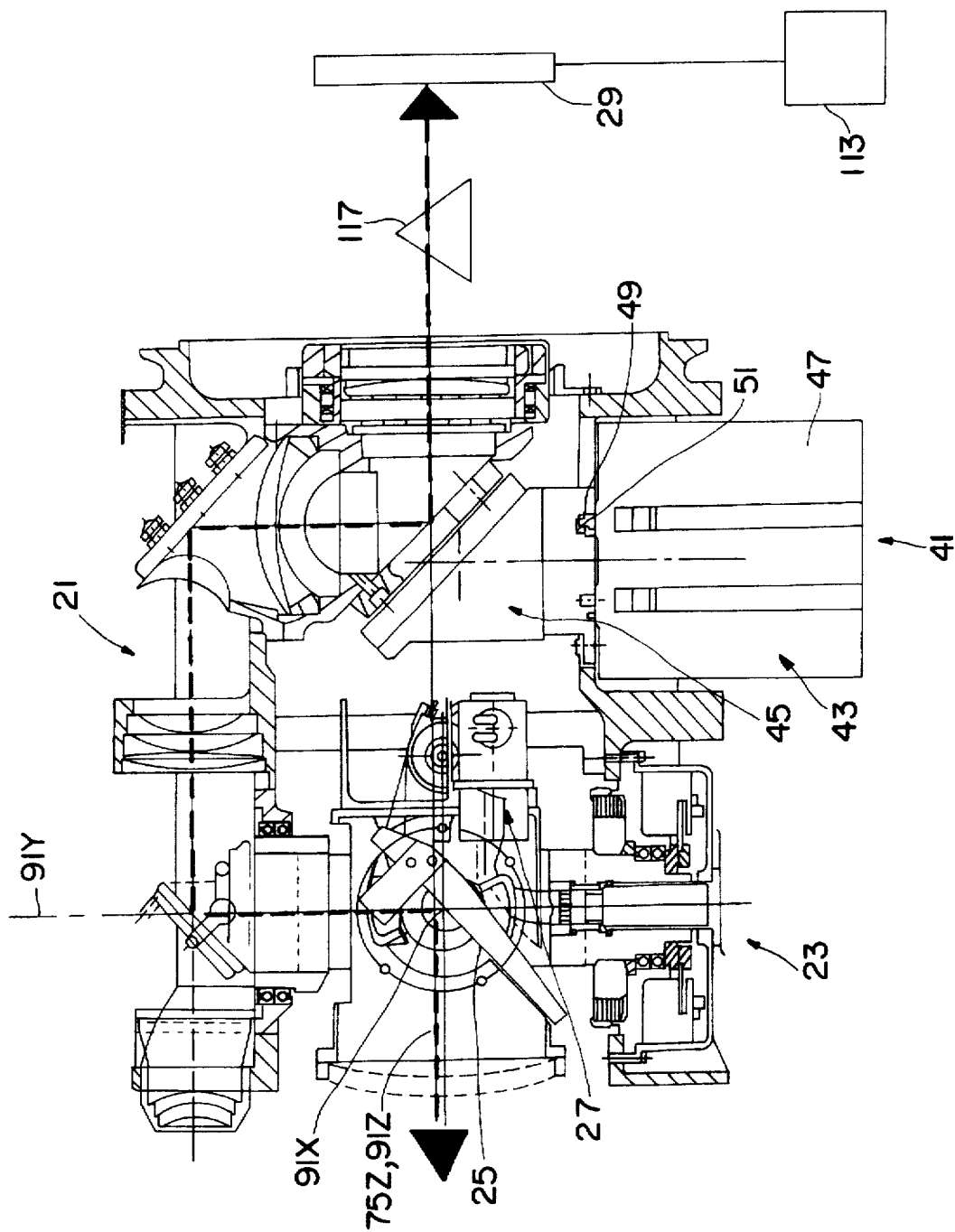
FIG. 2 is a partially cross-sectional schematic view of the arrangement for the sensor assembly of FIG. 1 taken at section 2—2.

An arrangement in a scanning infrared search and track (IRST) sensor 21 according to an embodiment of the present invention is seen with reference to FIG. 1. Herein, the terms "arrangement" and "sensor" are used somewhat interchangeably; however, it will be appreciated that IRST sensors are well known in the art, the present invention relating to a method of boresighting such sensors and to an arrangement of components in such sensors. The scanning IRST sensor 21 detects and tracks targets relative to a fixed inertial reference frame. The sensor 21 includes a scanning device such as a sensor gimbal 23 having a stabilized mirror 25, and elevation and azimuth gyros 27, such as are shown in FIG. 2, as well as elevation and azimuth torquers and resolvers, bearings, and housings.

The sensor 21 includes a light detector array 29 having a field of view, ordinarily a rectangle having a longer dimension oriented vertically and a shorter dimension oriented horizontally, that is projected into object space along a line of sight perpendicular to the long dimension of the field of view. When the sensor gimbal 23 is pivoted or rotated, the detector 29 scans a field of search. Signals from the detector 29 are processed and corresponding images are provided on a pixel 113 map of the scanned field of search (FIGS. 5B, 6B, 7B, and 8B).

The sensor 21 also includes an in-flight boresight module 41 (BSM) (FIGS. 2 and 3) including an inertial attitude unit (IAU) 43 (FIG. 2) in the form of a gyro triad with three orthogonal gyro axes aligned to precision mounting features on an IAU housing. The gyro axes are preferably established by three ring laser gyros inside the IAU. The performance of the gyros and their packaging determine the precision of the results of the boresight operation. The sensor 21 combines inputs from the IAU 43, an aircraft inertial navigational system (not shown), and sensor gimbal angle readouts to determine the orientation of the sensor gimbal 23 within inertial space.

Figure 3:
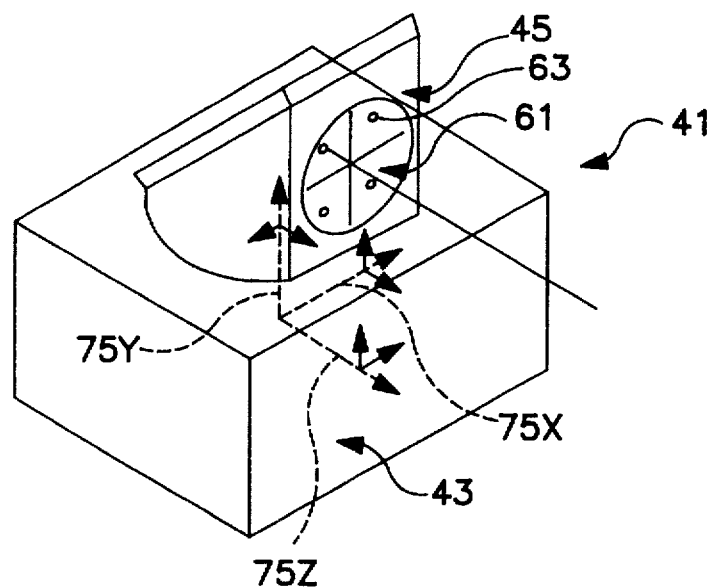
FIG. 3 is a schematic perspective view of a boresight module according to an embodiment of the present invention.

The BSM 41 enables the sensor 21 to be boresighted to a fixed inertial reference frame. As seen in FIG. 3, the BSM 41 includes the IAU 43 and a boresight collimator (BSC) 45. A glass boresight reticle including a reticle pattern 63 is located substantially at a focal surface of the BSC optical system in the form of a reflective, conventional Cassegrain, having a concave aspheric primary mirror and a convex aspheric secondary mirror.

The IAU 43 has a gyro triad with three orthogonal gyro axes aligned to precision mounting features 49 on a housing of the IAU. The BSC 45 has matching mounting features 51 by which it is mounted on the IAU housing 43. Preferably, both the IAU 43 and the BSC 45 have three co-planar mounting pads (not shown), which determine elevation and roll between the two assemblies.

The two subassemblies are preferably bolted together, one bolt through the center of each pad. There are preferably also locating pins (not shown) that determine the clocking in azimuth between the subassemblies. The gyro triad orientation in the IAU and the boresight reticle in the BSC are independently adjusted relative to their respective mounting features. Since these separate adjustments are not generally sufficiently accurate, the angular locations of features of the reticle pattern 63 are preferably surveyed with a theodolite after the BSC and the IAU are bolted together, and the BSC and the IAU are not separated thereafter. If desired or necessary, the same BSC and IAU pair may be separated and later recombined if the mechanical interface between them is sufficiently precise. Ordinarily, however, it would be preferably to resurvey the reticle features relative to the gyro axes.

Figure 4:
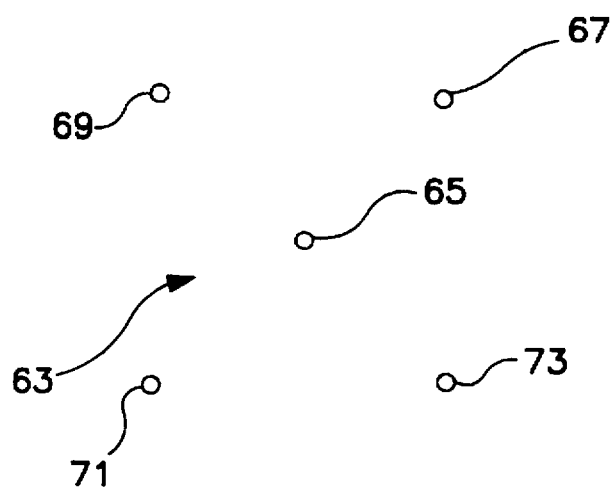
FIG. 4 is a plan view of a boresight reticle pattern according to an embodiment of the present invention.

The BSC 45 creates a collimated image of the reticle pattern 63. As seen in FIG. 4, the reticle pattern 63 preferably includes five small circular reflective dots 65, 67, 69, 71, and 73 deposited on a surface of a reticle substrate. Four of the dots, 67, 69, 71, and 73, are preferably arranged in a square pattern around a circle centered around the dot 65, although other patterns could be provided instead. It is preferred that the dots be separated from one another as much as practicable to maximize roll measurement precision.

Figure 5A:
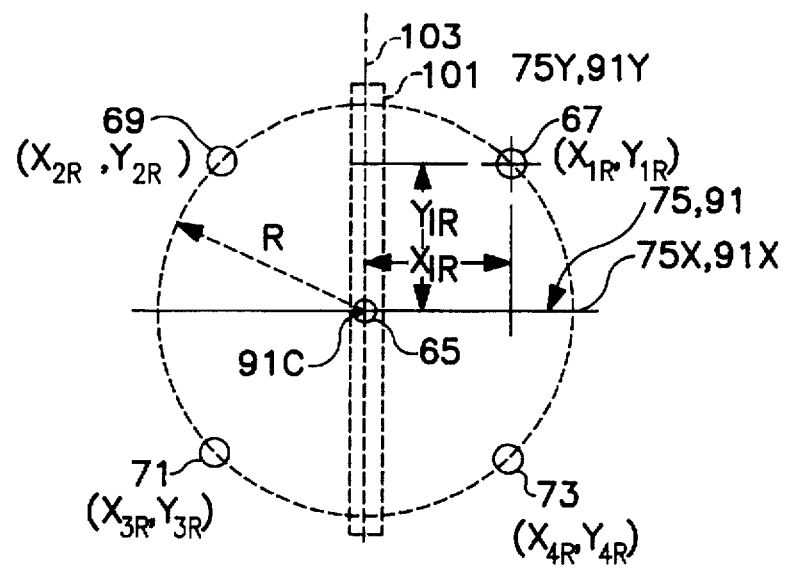
FIGS. 5A and 5B are, respectively, schematic views of reticle pattern inputs and a reticle pattern image produced thereby for a system having no scanner roll and no boresight module roll.
Figure 5B:
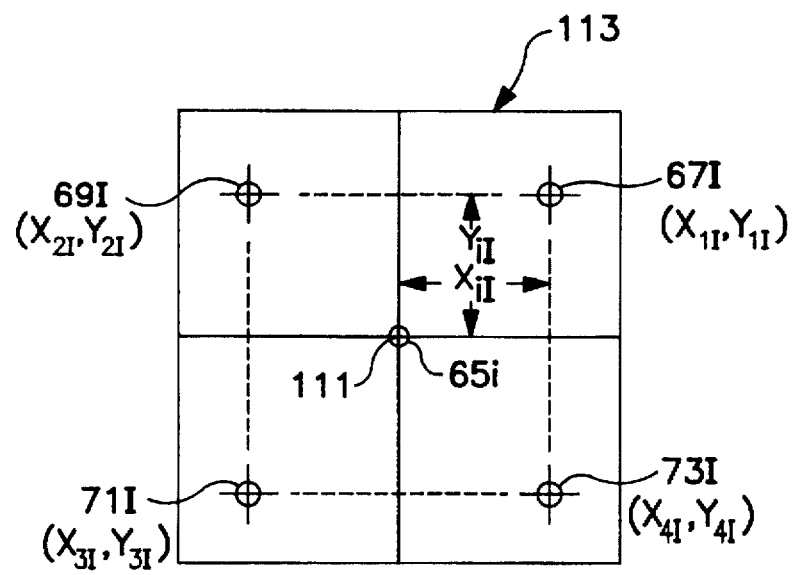
Figure 6A:
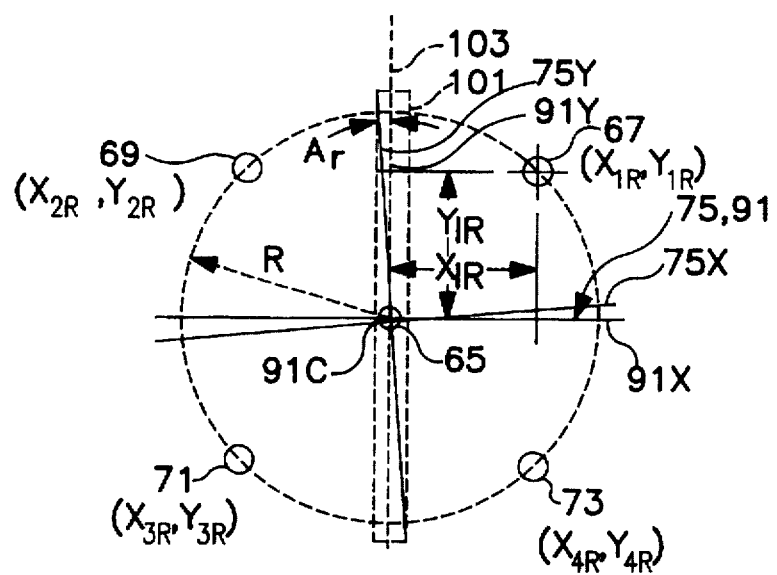
FIGS. 6A and 6B are, respectively, schematic views of reticle pattern inputs and a reticle pattern image produced thereby for a system in which there is boresight module roll and no scanner roll.

In FIGS. 5A, 6A, 7A, and 8A, the points 67, 69, 71, and 73 on the reticle are shown as having coordinates $(X_{1R}, Y_{1R})$, $(X_{2R}, Y_{2R})$, $(X_{3R}, Y_{3R})$, and $(X_{4R}, Y_{4R})$, respectively, in object space, with the projected field of view 101 of the detector 29 in object space being illustrated as superimposed over the points as a centerline 103 of the field of view crosses the intersection of the X-Y axes of the reticle pattern at point 65. In FIGS. 5A and 6A, there is no roll of the detector 29 about the roll axis of the sensor 21 whereas in FIGS. 7A and 8A there is roll of the detector about the roll axis of the sensor. The reticle pattern is scanned by the detector 29 by pivoting or rotating the sensor gimbal 23, and the points are depicted on the pixel map 113 as the points 67I, 69I, 71I, and 73I having coordinates $(X_{1I}, Y_{1I})$, $(X_{2I}, Y_{2I})$, $(X_{3I}, Y_{3I})$, and $(X_{4I}, Y_{4I})$, respectively, as seen in FIGS. 5B, 6B, 7B, and 8B. As discussed further below, with no roll of the detector 29 (FIGS. 5A, 6A), the images of the points appear as scaled replicas of the actual points (FIGS. 5B, 6B) as scanned in object space. With roll of the boresight module 41 only (FIG. 6A), the images of the points still appear as scaled replicas of the actual points as scanned in object space (FIG. 6B), but are rolled relative to the X-Y coordinates of the pixel map 113 in an amount equal to the boresight module roll. With roll of the detector 29 (7A, 8A), the images of the points are sheared and appear as a rhomboid (FIGS. 7B, 8B) because mapping of the images onto the detector 29 is from a non-orthogonal system to an orthogonal system. The present invention permits distinguishing boresight module roll from detector roll.

Figure 9:
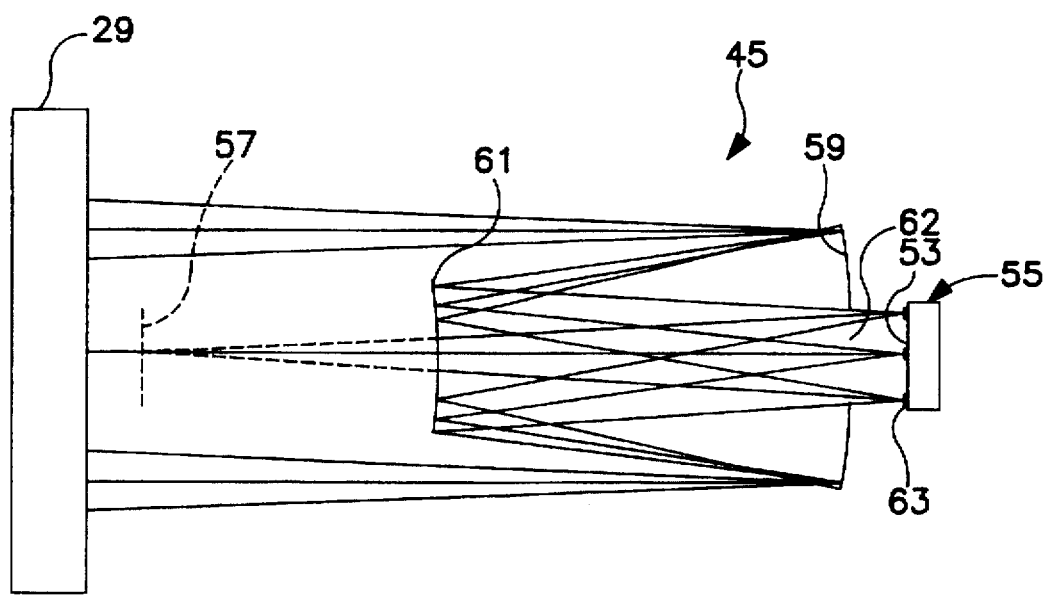
FIG. 9 is a schematic view of an arrangement of components of a boresight collimator according to an embodiment of the present invention.

The optical system preferably operates in the infrared spectrum during boresighting, and in the visible spectrum during surveying of the reticle pattern 63 and, accordingly, it is preferred that the BSC 45 be of a reflective design rather than refractive. As seen in FIG. 9, the radius of curvature of the surface 53 of the reticle 55 is preferably equal to a distance of the optical exit pupil 57 of the BSC 45 from the reticle surface 53 so that rays traced from a cold detector 29 to the reticle will reflect off of the highly reflective dots of the reticle pattern 63 and return to the detector 29 to the same point from which they originated.

The BSC 45 preferably includes, in addition to the reticle 55, a primary mirror 59 and a secondary mirror 61, as shown in FIG. 9, with the BSC exit pupil 57 being the image of an aperture 62 in the primary mirror formed by the secondary mirror. The reticle 55 is preferably a glass substrate with high emissivity and low reflectivity, and the reticle pattern 63 preferably includes a pattern of highly reflective dots with low emissivity. FIG. 9 shows only the detector 29, for purposes of discussion, where, ordinarily, other elements such as a derotation prism and imaging optics are disposed between the BSC 45 and the detector. When the detector views a dot on the reticle pattern 63, narcissus causes the dot to appear cold, or approximately the same temperature as the detector 29, relative to the surrounding reticle substrate. Since the dots are reflective, they do not emit much thermal energy of their own, i.e., they have low emissivity, so that, when looking into the BSC, certain points on the detector 29 "see themselves" as cold points.

If desired or necessary, the dots may be some shape other than circular. For example, the reticle may have large circular reflective patches with small square openings. The reflective patches establish a cold background due to narcissus against which the warm squares are viewed. Such a configuration may be preferred to obtain high signal to noise ratios and a subpixel precision centroid measurement. The square openings may be sized to facilitate visual surveying of the dots relative to the gyro axes.

By positioning the boresight collimator exit pupil 57 to be concentric with the boresight reticle, reticle contrast is enhanced as a result of narcissus from the features of the reticle pattern 63. If the surface 53 of the reticle 55 is concentric with the BSC exit pupil 57, as shown in FIG. 9, then rays traced from the detector 29 will retroflect at the highly reflective surface features, such as dots, of the reticle pattern 63, and return to the same spot on the detector. Therefore, the features of the reticle pattern 63 appear cold, because the only source of illumination for the dots is energy from the detector 29, which is cold itself. Thus, where the boresight collimator exit pupil 57 is concentric with the boresight reticle, reticle contrast as a result of narcissus from the reticle pattern features is enhanced.

The temperature difference may be further enhanced by heating the reticle 55, but this is not necessary. Heating slightly enhances the contrast, i.e., signal to noise ratio, between the features of the reticle pattern 63 and the background. Enhanced contrast improves the accuracy with which the centroid of the features of the reticle pattern 55 can be determined.

As seen in FIG. 5A, in a perfectly oriented system, the BSM 41 is oriented so that an X-Y-Z coordinate system of the collimated reticle pattern, or reticle axes, including a horizontal axis 75X, a vertical axis 75Y, and a roll axis 75Z, aligns with the sensor scan axes, i.e., the vertical axis 75Y is parallel to an azimuth or scan direction axis 91Y of the sensor gimbal 23, the horizontal axis 75X is parallel to an elevation axis 91X parallel to the scan direction of the field of view 101 (shown by dotted lines) of the detector 29, the scan direction thus also being parallel to the horizontal axis 75X. and the roll axis 75Z of the collimated reticle pattern is parallel to a roll axis 91Z of a projection of the detector 29 in object space. With this orientation, the vertical centerline 103 of the field of view 101 of the detector 29 is parallel to the azimuth axis 91Y of the sensor scan axes and the vertical axis 75Y of the reticle axes 75.

A BSM line of sight, represented by a collimated image of the center dot 65, and BSM reticle roll are preferably precisely determined relative to the gyro axes of the BSM IAU 43 using an optical measurement technique wherein, after the BSC 45 is mounted on the IAU, the completed BSM is mounted on a three-axis rate table, and the IAU gyro axes are located. The azimuth and elevation positions of the five dots are then measured relative to the gyro axes using a theodolite, and the angular coordinates are then programmed into the IAU memory. Visual measurement techniques may be used if the BSC optical system is reflective.

In boresighting the sensor 21, the sensor gimbal 23 is moved, i.e., rotated, so that the sensor looks into the BSM 41 and the projected reticle pattern 63 is scanned by the detector 29 as an azimuth scanner. The gimbal 23 itself moves to scan the line of sight and preferably either rotates the mirror 25 at a constant angular rate or, as seen in FIG. 1, sweeps back and forth about a selected average position. Elevation and azimuth boresight errors are determined in a standard manner, preferably by measuring angular offset between the center 111 of the pixel map 113 of the sensor and a center image 65I of the reticle pattern 63.

If desired, the gimbal 23 may be moved so that the image of the center point 65I of the reticle pattern 63 is at zero elevation relative to the center 91C of the sensor scan, or azimuth, axis 91Y so that the roll axes 75Z and 91Z of the BSM 41 and the sensor 21, respectively, are aligned. This is shown in FIGS. 5A–8B for convenience of discussion. In the horizontal direction, the detector 29 will view the central point 65 as the gimbal 23 scans about the azimuth axis 91Y; the position of the image 65I of the dot within the pixel map will be determined by the azimuth locations of the edges of the pixel map, relative to the line of sight of the BSC. By delaying or advancing the beginning of the frame of image data, the image 65I of the dot 65 may be moved in azimuth within the map. However, it is not necessary to move the gimbal to place the central point 65 of the reticle pattern 63 in the center of the sensor field of view. The center point 65 is preferably used as a coordinate center; the positions of the other points are measured relative to the center point. All that is necessary is establishment of the positions of the points in the pixel map relative to one another. If desired or necessary, the center dot 65 may be omitted from the reticle pattern 63, and different patterns of dots or other referencing indicia may be used. However, the five dot reticle pattern 63 having four dots arranged at an equal distance from a center dot is shown and discussed here by way of example.

As seen in FIGS. 5A and 5B, if the centerline 103 of the detector field of view 101, the scan axes, and the reticle axes are perfectly aligned, i.e., the centerline is parallel to the vertical axis 75Y of the reticle axes and to the azimuth axis 91Y of the scan axes, and the horizontal axis 75X is parallel to the direction of scan 91X, the images 65I, 67I, 69I, 71I, and 73I of the points 65, 67, 69, 71, and 73 of the reticle pattern 63 appear on the pixel map 113 as a scaled replica of the reticle pattern.

BSM roll error may occur due to many different factors. Errors in mounting the BSM module within the sensor assembly structure, or flexure of the sensor assembly may result in roll of the BSM itself. Further, rotation of the reticle image on the pixel screen can occur because of factors such as reticle rotation, forward sensor assembly roll, and roll of a derotation prism 117. Fast steering mirror roll, thermal expansion, and electronic drifts may contribute to BSM roll error, but most likely only in a minor way. As discussed further below, if the detector 29 is not parallel to the scan axis, i.e., if it is rotated about the roll axis 91Z, then the reticle pattern image will be distorted, causing the images 67I, 69I, 71I, and 73I of the four dots 67, 69, 71, and 73 to lie in a rhombic pattern instead of a square. To the extent that there is rhombic distortion, it is caused only by rotation of the detector 29 relative to the scan axis, not by BSM roll. The rhombic distortion permits separation of BSM roll from detector roll relative to the scan axis.

If the horizontal axis 75X and vertical axis 75Y of the BSM 41 rotate relative to the scan direction 91X and the azimuth axis 91Y, i.e., the BSM rotates around the roll axes 75Z and 91Z, the reticle pattern image rotates by the same amount. This is illustrated by comparing the reticle pattern image inputs shown in FIG. 6A, which shows only roll of the BSM 41, with the reticle pattern image shown in FIG. 6B. To determine roll of the BSM 41, the measured coordinates of the reticle image inputs, namely the coordinates of the images 67I, 69I, 71I, and 73I of the dots 67, 69, 71, and 73 on the pixel map 113, are related to the known coordinates of the dots by the following matrix equation:

$$\begin{pmatrix} X_{iI} \\ Y_{iI} \end{pmatrix} = \begin{pmatrix} \cos A_r & -\sin A_r \\ \sin A_r & \cos A_r \end{pmatrix} \begin{pmatrix} X_{iR} \\ Y_{iR} \end{pmatrix} \qquad \text{Eqn. 1}$$

Where, when "i" merely identifies a first, second, third, etc. one of the points or dots on a reticle pattern:

$X_{iI}$=X coordinate of an image of a reticle point on the pixel map;

$Y_{iI}$=Y coordinate of an image of a reticle point on the pixel map;

$X_{iR}$=X coordinate of a reticle point along the horizontal axis 75X;

$Y_{iR}$=Y coordinate of a reticle point along the vertical axis 75Y; and $A_r$=angle of roll of the reticle axes 75X and 75Y relative to the scan axes 91X and 91Y, respectively.

The coordinates of the image of the points are represented by the linear equations:

$$X_{iI} = X_{iR} \cos A_r - Y_{iR} \sin A_r \qquad \text{Eqn. 1A}$$

$$Y_{iI} = X_{iR} \sin A_r + Y_{iR} \cos A_r \qquad \text{Eqn. 1B}$$

When the relation of the coordinates of the dots on the pixel map 113 to the coordinates of the dots on the reticle is known, equations 1A and 1B may be used in a variety of ways to solve for Ar. For example, equations 1A and 1B may be solved simultaneously using the pixel map and reticle coordinates of any single outer dot. Alternatively, from either equation 1A or equation 1B, a pair of simultaneous equations can be created for any pair of dots.

The position of an object within the pixel map 113 is determined by: (a) the azimuth scan angle of the gimbal sensor 23 at which energy from the object falls on the detector 29; and (b) the distance from the center of the detector 29 at which the energy falls. In mapping object coordinates onto the pixel map 113, a distinction is made between two coordinate systems. The first coordinate system is the coordinate system scanned by the detector 29, in which objects have coordinates $X_S$ and $Y_S$ (not illustrated). In this coordinate system, the $X_S$ angular coordinate of the object is given by the particular azimuth scan angle of the gimbal sensor 23 at which energy is detected, and the $Y_S$ angular coordinate of the object is given by the height, measured along the detector centerline, at which the energy is detected. The second coordinate system is the pixel map coordinate system in which images of objects have coordinates $X_I$ and $Y_I$ (not illustrated). In this system, the $X_I$ and $Y_I$ coordinate axes are always assumed to be orthogonal.

Figure 6B:
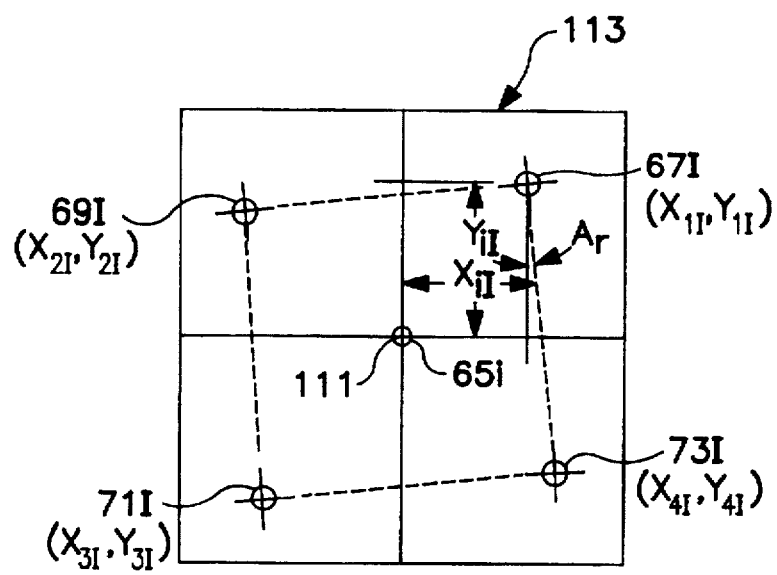

The scanning process maps $X_S$, $Y_S$ coordinates into $X_I$, $Y_I$ coordinates. Notice that, as long as the detector 29 is perpendicular to the scan direction (parallel to the scan axis, i.e., the azimuth axis 91Y), the mapping is from one orthogonal coordinate system to another, so the reticle image is undistorted. However, if the detector is rotated relative to the scan direction, the $X_S$, $Y_S$ coordinate system is no longer orthogonal but, rather, is sheared so the mapping is from a non-orthogonal system to an orthogonal system. As the result of the shearing of the $X_S$, $Y_S$ coordinate system, the image is distorted. Thus, as seen in FIGS. 6A and 6B, where the detector 29 scans the dots 67, 69, 71, and 73 of the reticle pattern, and the X-Y coordinates 75X and 75Y of the boresight module 41 are rolled relative to the roll axis 91Z, the coordinates of the images are only rolled an amount corresponding to the roll of the axes 75X and 75Y relative to the roll axis 91Z.

Figure 7A:
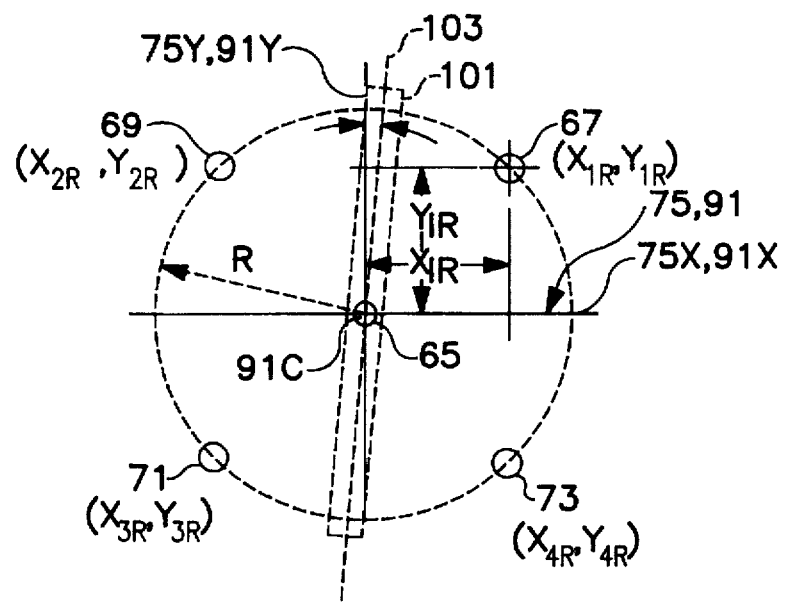
FIGS. 7A and 7B are, respectively, schematic views of reticle pattern inputs and a reticle pattern image produced thereby for a system in which there is scanner roll and no boresight module roll.
Figure 7B:
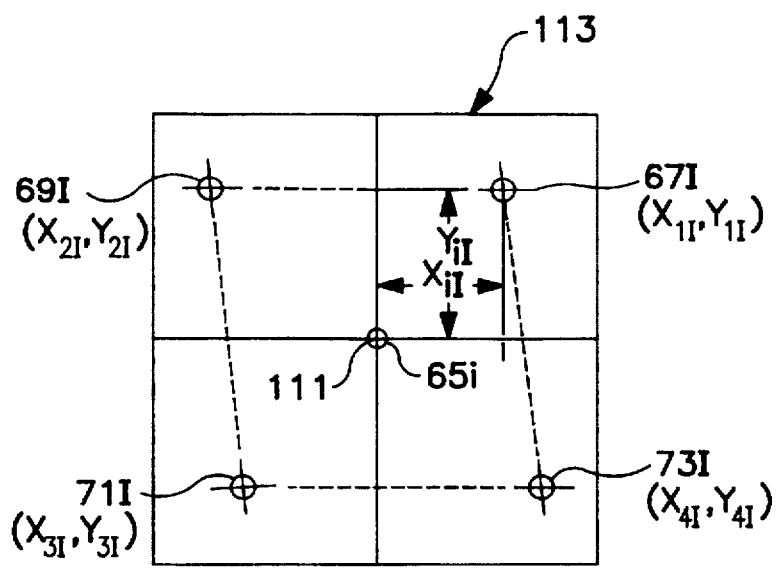

A somewhat different phenomenon is shown in FIGS. 7A and 7B, which illustrate the reticle image inputs and reticle image on the pixel screen 113 where there is roll error due to roll of the detector 29 relative to the roll axis 91Z. The relation of the inputs, i.e., the points in object space, such as the reticle points 65, 67, 69, 71, and 73, to the image, i.e., the points 65I, 67I, 69I, 71I, and 73I, is represented by the following matrix equation:

$$\begin{pmatrix} X_{iI} \\ Y_{iI} \end{pmatrix} = \begin{pmatrix} 1 & \tan A_d \\ 0 & \frac{1}{\cos A_d} \end{pmatrix} \begin{pmatrix} X_{iR} \\ Y_{iR} \end{pmatrix} \qquad \text{Eqn. 2}$$

Where:

Ad=angle of rotation of the detector centerline relative to the azimuth axis 91Y. The coordinates of the image of the points are represented by the linear equations:

$$X_{iI} = X_{iR} + Y_{iR} \tan A_d \qquad \text{Eqn. 2A}$$

$$Y_{iI} = \frac{Y_{iR}}{\cos A_d} \qquad \text{Eqn. 2B}$$

Figure 8A:
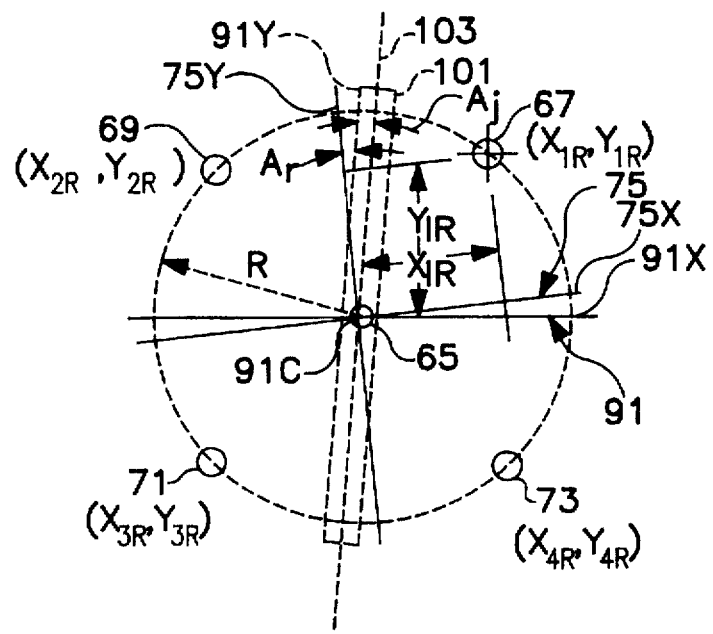
FIGS. 8A and 8B are, respectively, schematic views of reticle pattern inputs and a reticle pattern image produced thereby for a system in which there is both scanner roll and boresight module roll.
Figure 8B:
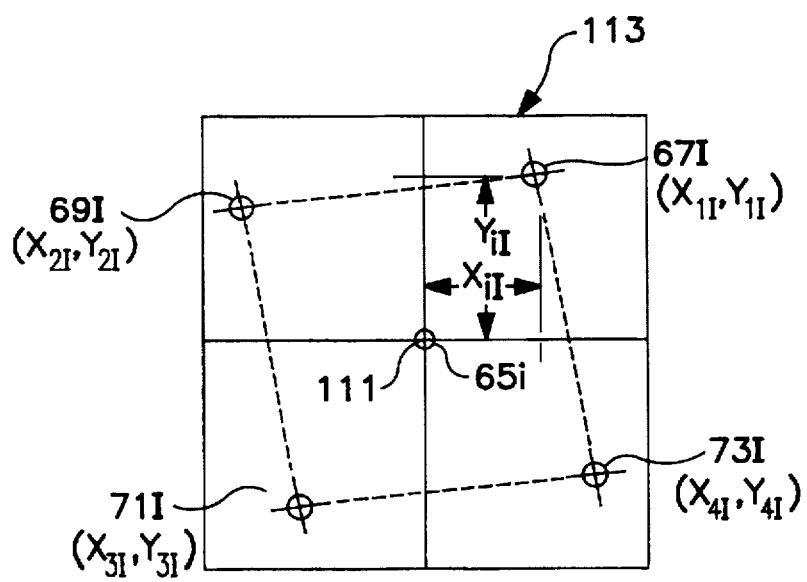

Thus, the reticle pattern image of the square pattern of dots 67, 69, 71, and 73 of the reticle pattern 63 having certain X-Y coordinates on the reticle axes will appear as a rhomboid on the pixel map 113 due to detector roll. When the relation of the coordinates of the dots on the pixel map 113 to the coordinates of the dots on the reticle is known, the reticle pattern image may be corrected mathematically or by adjusting components of the system, e.g., by adjusting a derotation prism 117. In a system having a roll gimbal, the reticle pattern image might also be corrected by rotating the gimbal 23 about the roll axis 91Z, which would rotate the azimuth axis relative to the detector 29. Also, if desired or necessary, the detector 29 itself might also be rotated to correct the reticle pattern image, although bulky cables might tend to interfere with this.

Where there is both BSM roll and detector roll, the reticle image inputs and the reticle image on the pixel screen are illustrated by FIGS. 8A and 8B, respectively, and are represented by the following matrix equation:

$$\begin{pmatrix} X_{iI} \\ Y_{iI} \end{pmatrix} = \begin{pmatrix} 1 & \tan A_d \\ 0 & \frac{1}{\cos A_d} \end{pmatrix} \begin{pmatrix} \cos A_r & -\sin A_r \\ \sin A_r & \cos A_r \end{pmatrix} \begin{pmatrix} X_{iR} \\ Y_{iR} \end{pmatrix} \qquad \text{Eqn. 3}$$

Thus, the coordinates of the image of the points are represented by the linear equations:

$$X_{IJ} = X_{iR} \cos A_r - Y_{iR} \sin A_r + (X_{iR} \sin A_R + Y_{iR} \cos A_R) \tan A_d \qquad \text{Eqn. 4}$$

$$Y_{IJ} = X_{iR} \frac{\sin A_r}{\cos A_d} + Y_{iR} \frac{\cos A_r}{\cos A_d} \qquad \text{Eqn. 5}$$

Error due to detector roll and due to BSM roll may be isolated using the foregoing relationships. Since the coordinates of the points 67, 69, 71, and 73 are preferably in a square pattern on a circle of radius R, the coordinates of these points on the reticle axes are:

$$X_{1R} = Y_{1R} = \frac{\sqrt{2}}{2} R \qquad \text{Eqn. 6A}$$

$$X_{2R} = -Y_{2R} = -\frac{\sqrt{2}}{2} R \qquad \text{Eqn. 6B}$$

$$X_{3R} = Y_{3R} = -\frac{\sqrt{2}}{2} R \qquad \text{Eqn. 6C}$$

$$X_{4R} = -Y_{4R} = \frac{\sqrt{2}}{2} R \qquad \text{Eqn. 6D}$$

Inserting the foregoing inputs into Equations 4 and 5, above, yields the coordinates of the image points on the pixel map 113:

$$X_{1J} = \frac{\sqrt{2}}{2} R(\cos A_r - \sin A_r + \sin A_r \tan A_d + \cos A_r \tan A_d) \qquad \text{Eqn. 7A}$$

$$Y_{1J} = \frac{\sqrt{2}}{2} R \left[ \frac{\sin A_r + \cos A_r}{\cos A_d} \right] \qquad \text{Eqn. 7B}$$

$$X_{2J} = \frac{\sqrt{2}}{2} R(-\cos A_r - \sin A_r - \sin A_r \tan A_d + \cos A_r \tan A_d) \qquad \text{Eqn. 8A}$$

$$Y_{2J} = \frac{\sqrt{2}}{2} R \left[ \frac{-\sin A_r + \cos A_r}{\cos A_d} \right] \qquad \text{Eqn. 8B}$$

$$X_{3J} = -X_{1J} \qquad \text{Eqn. 9A}$$

$$Y_{3J} = -Y_{1J} \qquad \text{Eqn. 9B}$$

$$X_{4J} = -X_{2J} \qquad \text{Eqn. 10A}$$

$$Y_{4J} = -Y_{2J} \qquad \text{Eqn. 10B}$$

Given the foregoing coordinates of the image points, it is possible to solve for $A_r$ and $A_d$ as follows:

$$Y_{1J} - Y_{2J} = \frac{\sqrt{2}}{2} R \left[ \frac{(\sin A_r + \cos A_r)}{\cos A_d} - \frac{(-\sin A_r + \cos A_r)}{\cos A_d} \right] = \sqrt{2} R \frac{\sin A_r}{\cos A_d} \qquad \text{Eqn. 11A}$$

$$Y_{1J} + Y_{2J} = \sqrt{2} R \frac{\cos A_r}{\cos A_d} \qquad \text{Eqn. 11B}$$

so that:

$$\sin A_r = \frac{\sqrt{2}}{2} \frac{Y_{1J} - Y_{2J}}{R} \cos A_d \qquad \text{Eqn. 12A}$$

$$\cos A_r = \frac{\sqrt{2}}{2} \frac{Y_{1J} - Y_{2J}}{R} \cos A_d \qquad \text{Eqn. 12B}$$

Since $\sin^2 A_r + \cos^2 A_r = 1$, it is possible to solve for $\cos A_d$, which is:

$$\cos A_d = \frac{R}{\sqrt{Y_{1J}^2 + Y_{2J}^2}} \qquad \text{Eqn. 13}$$

The value of $\sin A_r$ may be determined by substituting Equation 13 into Equation 12A, so that:

$$\sin A_r = \frac{\sqrt{2}}{2} R \frac{Y_{1J} - Y_{2J}}{\sqrt{Y_{1J}^2 + Y_{2J}^2}} \qquad \text{Eqn. 14}$$

The foregoing equations are sufficient to determine $A_r$ and the magnitude of $A_d$ based on measurement of the coordinates of the reticle pattern image points alone. To determine the sign (i.e., positive or negative, or counter-clockwise or clockwise, respectively, roll of the detector 29 relative to the azimuth axis 91Y), the following equation, derived from Equation 4, above, may be used:

$$\tan A_d = \frac{X_{1J} - X_{iR} \cos A_r + Y_{iR} \sin A_r}{X_{iR} \sin A_r + Y_{iR} \cos A_r} \qquad \text{Eqn. 15}$$

In practice, the coordinates of the points 67I, 69I, 71I, and 73I of the reticle pattern image on the pixel map 113 are measured. The radius R to the points 67, 69, 71, and 73 of the reticle pattern 63 from the point 65 is known. Thus, using Equation 13, the magnitude of $A_d$ may be determined; using Equation 14, the value, including sign, of $A_r$ may be determined; and, using Equation 15, the sign of $A_d$ may be determined, e.g., with a computer. When the values of $A_d$ and $A_r$ are determined, i.e., the roll error due to detector roll and the error due to BSM roll, are isolated, it is possible to then take appropriate corrective measures, e.g., rotate the detector 29, the BSM 41, etc. It is not necessary to correct BSM roll, since merely knowing it is sufficient. The derotation prism 117 is preferably provided to compensate for rotation of the image caused by rotation of the gimbal 23, and is preferably also used to compensate for detector 29 roll.

While this invention has been illustrated and described in accordance with a preferred embodiment, it is recognized that variations and changes may be made therein without departing from the invention as set forth in the claims.

What is claimed is:

1. A method for boresighting an infrared search and track sensor to an inertial reference frame provided by a boresight module, comprising the steps of:

projecting a collimated image of a reticle pattern of the boresight module;

scanning the projected image with a detector to obtain a scanned image of the reticle pattern;

isolating rotation of the scanned image due to boresight module roll and distortion of the scanned image due to detector roll; and removing distortion of the scanned image due to detector roll.

2. The method of claim 1, wherein the boresight module includes an inertial attitude unit, the method comprising the further step of projecting a center of the reticle pattern in a direction parallel to a roll axis of the inertial attitude unit.

3. The method of claim 1, wherein rotation due to boresight module roll and distortion due to detector roll are isolated by measuring coordinates of features of the scanned image and relating the measured coordinates of the features of the scanned image to actual coordinates of features of the reticle pattern.

4. An arrangement in an infrared search and track sensor, comprising:

a detector for scanning a field of search;

a boresight module including a boresight collimator, the boresight collimator projecting a collimated image of a reticle pattern on a reticle of the boresight collimator, and an inertial attitude unit having a roll axis, the collimated image being projected parallel to the roll axis of the inertial attitude unit;

a pixel map associated with the detector, the pixel map containing an image of the scanned field of search;

the detector being arranged to scan the reticle pattern so that the pixel map contains an image of the scanned reticle pattern; and a processor, the processor isolating rotation of the scanned image due to roll of the boresight module around the roll axis and distortion of the scanned image due to roll of the detector.

5. The arrangement in an infrared search and track sensor as set forth in claim 4, further comprising a sensor gimbal, the sensor gimbal turning about an azimuth axis to project a field of view of the detector across the field of search.

6. The arrangement in an infrared search and track sensor as set forth in claim 4, wherein the boresight collimator includes a boresight collimator exit pupil concentric with the reticle such that reticle contrast as a result of narcissus from the reticle pattern features.

* * * * *

UNITED STATES PATENT AND TRADEMARK OFFICE
CERTIFICATE OF CORRECTION

PATENT NO. : 5,783,825  
DATED : July 21, 1998  
INVENTOR(S) : Gary E. Wiese

It is certified that error appears in the above-identified patent and that said Letters Patent is hereby corrected as shown below:

Column 2, lines 5-6, change "electromechanical" to --electro-mechanical--

Column 4, line 62, change "a" to --the--

Column 5, line 27, change "ofthe" to --of the--

Column 6, line 20, change "651" to --65 I--

Column 6, line 22, change "651" to --65 I--

Column 6, line 33, change "651" to --65 I--

Column 6, line 51, change "651" to --65i--; change "691" to --69I--; change "711" to --71I--

UNITED STATES PATENT AND TRADEMARK OFFICE
CERTIFICATE OF CORRECTION

PATENT NO. : 5,783,825

DATED : July 21, 1998

INVENTOR(S) : Gary E. Wiese

It is certified that error appears in the above-identified patent and that said Letters Patent is hereby corrected as shown below:

Column 6, line 52, change "731" to --73I--

Column 7, line 45, change "Ar" to --$A_r$--

Column 8, line 26, change "691" to --69I--

Column 9, line 66, change "$COS^2A_r$" to --$cos^2A_r$--

Column 10, line 22, change "691" to --69I--

Signed and Sealed this

Fifteenth Day of June, 1999

Attest:

Q. TODD DICKINSON

Attesting Officer

Acting Commissioner of Patents and Trademarks